Nov. 14, 1961     W. B. McKNIGHT ET AL     3,009,065
POSITIVE-NEGATIVE RADIATION DETECTOR

Filed June 9, 1960

4a

4b

4c

WILLIAM B. McKNIGHT
NICHOLAS J. MANGUS, JR
DALE E. HOLTER,
*INVENTORS.*

BY *S. J. Rotondi*
*A. P. Dupont*
*C. A. Phillips*
ATTORNEYS.

United States Patent Office 3,009,065
Patented Nov. 14, 1961

3,009,065
POSITIVE-NEGATIVE RADIATION DETECTOR
William B. McKnight, Guntersville, and Nicholas J. Mangus, Jr., and Dale E. Holter, Huntsville, Ala., assignors to the United States of America as represented by the Secretary of the Army
Filed June 9, 1960, Ser. No. 35,094
2 Claims. (Cl. 250—233)
(Granted under Title 35, U.S. Code (1952), sec. 266)

The invention described herein may be manufactured and used by or for the Government for government purposes without the payment of royalty thereon.

The present invention relates to radiation choppers, and more particularly to a form of positive-negative radiation chopper.

Radiation chopping devices, as generally used in target detection, location and guidance systems, employ a simple "go-no-go" type of chopper in order to sense targets.

This type of chopper has certain inherent shortcomings, a major one being the inability to detect targets of different character, particularly those which are negative, "cold" with respect to their background, as well as those which are positive, "hot" with respect to their background. A further disadvantage of the conventional chopper device is the inherent low efficiency of the type of chopping employed, that is, the resulting signal to noise ratio tends to be low.

Accordingly it is the object of the present invention to provide a radiation chopper which will sense targets with differing characteristics with respect to their background and which offer increased output in many instances.

In accordance with the invention a radiation detector is constructed employing a chopper which utilizes a pair of filters, one passing the band in which the object to be detected is radiating, and another passing other spectra, principally that of the background, but blocking radiation of the spectra of the object to be detected. The chopping action of these filters thus becomes positive and negative with respect to a neutral or background level, and hence becomes additive.

The invention will be further explained and better understood by the following specification including references to the drawings, in which.

Figure 1:
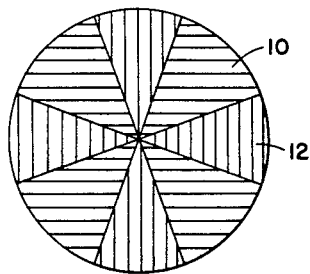
FIGURES 1-2 illustrate chopper configurations constructed in accordance with the invention.
Figure 2:
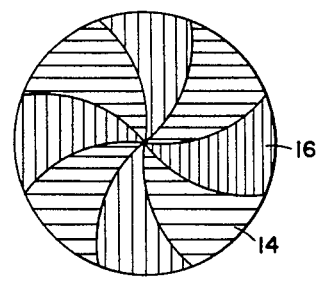

Referring now to the drawings, FIGURE 1 shows basic features of the invention in which filters comprise alternate sectors of a circle. One of the filters, filter 10 is a filter which will pass one or more of the spectra normally found in the expected background (e.g. blue), but does not pass the spectra radiated by the device target (e.g. infrared). On the other hand filter 12 consists of a filter which will pass only the spectra radiated by the desired target (here, infra-red). FIGURE 2 reveals another possible form of the device in which the circular chopper comprises spiral radial filter segments consisting of filters 14 and 16 which differ as do filters 10 and 12 in FIGURE 1.

Figure 4:
FIGURE 4 shows a series of waveforms illustrating the operation of the invention.
Figure 4:
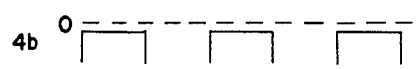
Figure 4:
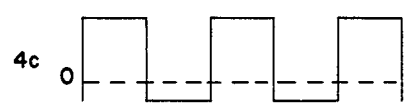
Figure 3:
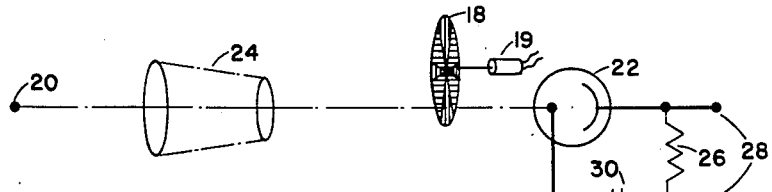
FIGURE 3 shows a radiation detection system incorporating the chopper of FIGURE 1.

Referring to FIGURE 3 a chopper wheel 18 of a type described with respect to FIGURES 1 and 2, driven by motor 19 is positioned to chop radiation received from object 20 and its background. This radiation is focused on photo-detector 22 by imaging device 24, shown connected to produce an electrical output across resistor 26 and terminals 28. The photo-detector is biased by source 30. The detection circuit may be any type of circuit capable of sensing the radiation to be encountered. In operation, when radiation from a target is focused through the filter designed to pass this radiation the photo-detector will respond to produce an output, represented by the series of outputs shown in FIGURE 4a illustrating the chopped effect. When the "target pass" filter is on-target the "background" pass filter sees only the background and thus synchronously, radiation thru the "background" pass filter contributes to a photo-detector output. When the background filter views the target, the target appears as a "hole" in the radiation and it contributes to less detector output. This is shown in FIGURE 4b which illustrates the output caused by the background filter. The net output, which is the sum of the output of FIGURES 4a and 4b, is shown in FIGURE 4c. The improvement over a prior art go-no-go chopping device in increased output is clearly illustrated by the difference between FIGURES 4a and 4c as there would be no output corresponding to FIGURE 4b.

The principles of the invention explained in connection with specific exemplifications thereof will suggest many other applications and modifications of the same. It is accordingly desired that, in construing the breadth of the appended claims, they shall not be linked to the specific details shown, and described in connection with exemplifications thereof.

Therefore what it is desired to be secured by Letters Patent of the United States is:

1. A radiation detector for sensing a target with differing background characteristics comprising a rotary chopping element, motor means for rotating said element, said chopping element comprising a plurality of radial sectors extending from the center of rotation to the periphery of said element, said sectors comprising first and second alternately arranged radiation filters, said first filters being transparent to an infra-red band of radiation from said target and opaque to a blue band of radiation surrounding the target, said second filters being transparent to the blue band of radiation and opaque to the infra-red band of radiation, said chopping element being aligned with means for projecting said radiation bands through said filters on to a detector circuit, said circuit comprising a photo-detector, a bias source, and a terminating output impedance, the rotation of said first filter in the path of the infra-red radiation providing a positive signal across the impedance with respect to target background and the rotation of said second filter in the path of the blue radiation providing a negative signal across the impedance with respect to target background.

2. The detector as in claim 1 in which said means for projecting radiation is an imaging device for focusing the radiation on to the detector circuit.

References Cited in the file of this patent
UNITED STATES PATENTS

| | | |
|---|---|---|
| 1,450,061 | Coblentz | Mar. 27, 1923 |
| 2,374,916 | Bierderman | May 1, 1945 |
| 2,648,253 | Sweet | Aug. 11, 1953 |
| 2,931,911 | Nichols | Apr. 5, 1960 |